United States Patent
Masada et al.

(10) Patent No.: US 9,741,479 B2
(45) Date of Patent: Aug. 22, 2017

(54) MAGNETIC POWDER FOR MAGNETIC RECORDING MEDIUM

(71) Applicants: DOWA ELECTRONICS MATERIALS CO., LTD., Tokyo (JP); FUJIFILM Corporation, Tokyo (JP)

(72) Inventors: Kenji Masada, Tokyo (JP); Hirohisa Omoto, Tokyo (JP); Futoshi Nagashima, Tokyo (JP); Daisuke Abe, Tokyo (JP); Toshio Tada, Kanagawa (JP); Norihito Kasada, Kanagawa (JP)

(73) Assignees: DOWA ELECTRONICS MATERIALS CO., LTD., Tokyo (JP); FUJIFILM CORPORATION, Tokyo (JP)

( * ) Notice: Subject to any disclaimer, the term of this patent is extended or adjusted under 35 U.S.C. 154(b) by 191 days.

(21) Appl. No.: 14/529,544

(22) Filed: Oct. 31, 2014

(65) Prior Publication Data

US 2015/0123026 A1 May 7, 2015

(30) Foreign Application Priority Data

Nov. 1, 2013 (JP) .................. 2013-227812
Sep. 29, 2014 (JP) .................. 2014-198633

(51) Int. Cl.
*H01F 1/11* (2006.01)
*H01F 1/03* (2006.01)
*G11B 5/706* (2006.01)
*C01G 49/00* (2006.01)

(52) U.S. Cl.
CPC ........... *H01F 1/11* (2013.01); *C01G 49/0036* (2013.01); *G11B 5/70678* (2013.01); *C01P 2002/76* (2013.01); *C01P 2006/42* (2013.01)

(58) Field of Classification Search
CPC ...... H01F 1/11; H01F 1/0313; C01P 2006/42; B82Y 25/00

USPC ........................ 252/62.63, 62.51 R
IPC ..................................... C01P 2006/42
See application file for complete search history.

(56) References Cited

U.S. PATENT DOCUMENTS

2005/0214593 A1* 9/2005 Dousita .............. C08J 7/045
                                                428/842.5
2012/0177951 A1* 7/2012 Yamazaki ............. H01F 1/11
                                                428/842.8

FOREIGN PATENT DOCUMENTS

JP          04059620 A  *  2/1992
JP          2011-178654     9/2011
JP          2011-225417    11/2011

OTHER PUBLICATIONS

JP04059620A, English abstract, 1992, 1 page.*

* cited by examiner

*Primary Examiner* — Matthew E Hoban
*Assistant Examiner* — Lynne Edmondson
(74) *Attorney, Agent, or Firm* — Clark & Brody

(57) ABSTRACT

Provided is magnetic powder capable of enhancing simultaneously both magnetic characteristics including SNP and durability of a magnetic recording medium. The hexagonal ferrite magnetic powder for a magnetic recording medium has a Ba/Fe molar ratio of 8.0% or more, a Bi/Fe molar ratio of 2.5% or more and an Al/Fe molar ratio of from 3.0 to 6.0%. The magnetic powder preferably has an activation volume Vact of from 1,400 to 1,800 nm³. The magnetic powder particularly preferably has a coercive force Hc of from 159 to 279 kA/m (which is approximately from 2,000 to 3,500 Oe) and a coercivity distribution SFD of from 0.3 to 1.0. The magnetic powder may contain, as an element that substitutes an Fe site of the hexagonal ferrite, at least one kind selected from divalent transition metals M1 and tetravalent transition metals M2.

4 Claims, No Drawings

MAGNETIC POWDER FOR MAGNETIC RECORDING MEDIUM

FIELD OF THE INVENTION

The present invention relates to M-type hexagonal ferrite magnetic powder for a magnetic recording medium.

BACKGROUND ART

As magnetic powder suitable for high-density recording used in a magnetic recording medium, hexagonal ferrite magnetic powder has been known. For example, JP-A-2011-178654 describes hexagonal ferrite magnetic powder that has a small particle size and enhanced magnetic characteristics by adding a rare earth element and Bi.

A magnetic recording medium such as a magnetic tape is demanded to have excellent durability on running on a drive, in addition to favorable magnetic characteristics as a recording medium. JP-A-2011-225417 describes a technique of improving durability of a magnetic recording medium by using hexagonal ferrite magnetic powder having Al coated on the surface thereof.

Associated with the increasing use of digital data in recent years, a magnetic recording medium storing a huge amount of data is demanded to have improved characteristics on both the magnetic characteristics and the durability. It has been considered that it is substantially effective therefor to utilize both the technique for enhancing the magnetic characteristics with the hexagonal ferrite magnetic powder having Bi added thereto as described in JP-A-2011-178654 and the technique for enhancing the durability with the hexagonal ferrite magnetic powder having Al coated thereon as described in JP-A-2011-225417.

As a result of the investigations made by the present inventors, however, it has been found that the SNR (S/N ratio), which is one of the important factors of the magnetic characteristics of the recording medium, is not sufficiently improved only by utilizing the techniques described in JP-A-2011-178654 and JP-A-2011-225417. A magnetic recording medium is undergoing growing demand for SNR for dealing with a high recording density of these days.

SUMMARY OF THE INVENTION

An object of the invention is to provide magnetic powder that is capable of enhancing simultaneously both magnetic characteristics including SNR and durability of a magnetic recording medium.

As a result of detailed investigations made by the inventors, it has been found that it is considerably effective for enhancing SNR of a magnetic recording medium that in M-type hexagonal ferrite powder having been enhanced in magnetic characteristics by adding Bi thereto, the Ba content in the powder is sufficiently secured. It is considered that M-type hexagonal Ba ferrite powder containing Bi and Al described later may be industrially effectively produced by such a method that a molten material of a raw material mixture is quenched to form an amorphous material, which is then crystallized by heating to a prescribed temperature to synthesize the hexagonal ferrite, and JP-A-2011-178654 and JP-A-2011-225417 employ the method. In the case where the method is employed, in general, such a procedure is required that a residual substance containing mainly barium borate is removed by dissolution with an acid (acid cleaning) in the subsequent process step. Ba is one of the major components of M-type hexagonal ferrite having a basic structure $BaO \cdot 6Fe_2O_3$, but Ba that constitutes the ferrite may be eluted therefrom by the acid cleaning, and the actual Ba content may be smaller than the value that is estimated from the raw material composition in some cases. It is important to prevent the shortage of Ba. The invention has been completed based on the knowledge.

For achieving the aforementioned objects, the invention provides the following aspects.

According to one aspect of the invention, there is provided hexagonal ferrite magnetic powder for a magnetic recording medium, having a Ba/Fe molar ratio of 8.0% or more, a Bi/Fe molar ratio of 2.5% or more and an Al/Fe molar ratio of from 3.0 to 6.0%.

The hexagonal ferrite magnetic powder preferably has an activation volume Vact of from 1,400 to 1,800 $nm^3$.

The hexagonal ferrite magnetic powder particularly preferably has a coercive force Hc of from 159 to 279 kA/m (which is approximately from 2,000 to 3,500 Oe) and a coercivity distribution SFD of from 0.3 to 1.0.

The hexagonal ferrite magnetic powder may contain, as an element that partially substitutes an Fe site of the hexagonal ferrite, at least one kind selected from divalent transition metals and tetravalent transition metals.

In the description herein, a divalent transition metal that partially substitutes Fe is represented by M1, and a tetravalent transition metal that partially substitutes Fe is represented by M2. Examples of M1 include Co, Zn and the like, and examples of M2 include Ti, Sn and the like. The hexagonal ferrite magnetic powder preferably has an M1/Fe molar ratio of from 0 to 6.0% and an M2/Fe molar ratio of from 0 to 6.0%.

The Ba/Fe molar ratio, the Bi/Fe molar ratio and the Al/Fe molar ratio are values that are obtained by the following expressions based on the analytical values of the powder.

Ba/Fe molar ratio (%)=((Ba content (% by mol))/(Fe content (% by mol)))×100

Bi/Fe molar ratio (%)=((Bi content (% by mol))/(Fe content (% by mol)))×100

Al/Fe molar ratio (%)=((Al content (% by mol))/(Fe content (% by mol)))×100

The M1/Fe molar ratio and the M2/Fe molar ratio are values that are obtained by the following expressions based on the analytical values of the powder.

$M1$/Fe molar ratio (%)=(($M1$ content (% by mol))/(Fe content (% by mol)))×100

$M2$/Fe molar ratio (%)=(($M2$ content (% by mol))/(Fe content (% by mol)))×100

In the case where plural kinds of elements of M1 (for example, Co and Zn) are used, the M1 content is a value that is derived from the total molar number of the M1 elements. In the case where plural kinds of elements of M2 (for example, Ti and Sn) are used, the M2 content is a value that is derived from the total molar number of the M2 elements.

The hexagonal ferrite magnetic powder may be synthesized by a method of crystallizing an amorphous material of a raw material mixture containing Ba, Bi and Al. According to the invention, there is also provided a magnetic recording medium having a magnetic layer that contains the hexagonal ferrite magnetic powder.

The magnetic powder for a magnetic recording medium according to the invention may enhance both the magnetic characteristics of the magnetic recording medium, particularly SNR, and durability simultaneously in a higher level.

DETAILED DESCRIPTION OF EMBODIMENTS

Hexagonal Ferrite Magnetic Powder
Component Composition

The hexagonal ferrite in the invention is a magnetoplumbite type (M-type) having $BaO \cdot 6Fe_2O_3$ as the basic structure. The Fe sites thereof may be partially substituted by at least one kind of divalent transition metals M1 and tetravalent transition metals M2. Examples of the divalent transition metal M1 include Co, Zn and the like, and examples of the tetravalent transition metal M2 include Ti, Sn and the like. The magnetic characteristics of the hexagonal ferrite, such as the coercive force Hc, may be controlled by the substitution with the transition elements. The M1/Fe molar ratio is preferably from 0 to 6.0%, and the M2/Fe molar ratio is preferably from 0 to 6.0%. In the case where the divalent transition metal M1 is used, the M1/Fe molar ratio is preferably from 0.1 to 6.0%, and more preferably from 0 to 4.0%. In the case where the tetravalent transition metal M2 is used, the M2/Fe molar ratio is preferably from 0.1 to 6.0%, and more effectively from 0.5 to 6.0%.

Ba is one of the major components constituting the hexagonal ferrite, and it is considered that when Ba is eluted by the cleaning process with an acid, the Ba sites of the resulting magnetic powder may be partially vacant. The magnetic powder in this state may not sufficiently exhibit the magnetic characteristics that are inherently derived from the original crystal structure. In particular, magnetic powder having a reduced particle size, i.e., a large specific surface area, may largely suffer reduction in magnetic characteristics due to the loss of Ba. Accordingly, it is the current situation that the enhancement of SNR by the reduction of the particle size may be cancelled out thereby to make difficult the stable achievement of SNR satisfying a higher level requirement than the ordinary products.

In the case where a hexagonal ferrite is synthesized by crystallizing an amorphous material of a raw material mixture, the raw material mixture contains large amounts of Ba and B as components that are necessary for providing the amorphous material. Therefore, Ba is the constitutional component of the hexagonal ferrite and is simultaneously the component for providing the amorphous material. In the process of crystallization, Ba is distributed to the hexagonal ferrite and the other crystalline substances. As a result of investigations made by the inventors, it has been found that the amount of Ba that is distributed to the constitutional component of the hexagonal ferrite may be controlled to a certainly high level in consideration of the loss in the subsequent process, by controlling the component composition of the raw material mixture.

In the invention, the Ba/Fe molar ratio of the magnetic powder is 8.0% or more, and thereby the SNR in the magnetic recording medium may be stably maintained to a high level. It has been found that the SNR tends to be lowered when the Ba/Fe molar ratio is less than 8.0%. In the $BaO \cdot 6Fe_2O_3$ structure, the stoichiometric Ba/Fe molar ratio is approximately 8.33%. Even when Ba is eluted by the acid cleaning process or the like to make the Ba sites partially vacant, the adverse effect thereof to the magnetic characteristics may not be significant when the amount of the vacant sites is small. It is considered however that when the amount of the vacant sites is increased to a certain level or higher, the magnetic characteristics may be drastically deteriorated. In the case of the hexagonal ferrite magnetic powder of the invention, it is considered that the inherent magnetic characteristics may not be largely deteriorated when the Ba/Fe molar ratio is 8.0% or more, and consequently the SNR in the magnetic recording medium may be maintained to a high level.

The upper limit of the Ba/Fe molar ratio may not be necessarily determined since crystals containing Ba in an amount that largely exceeds the stoichiometric amount may not be synthesized essentially even when the Ba content in the raw material mixture is excessive. The Ba/Fe molar ratio may be generally 10.0% or less.

The total Fe amount of the hexagonal ferrite magnetic powder of the invention is 25% by mol or more.

The hexagonal ferrite magnetic powder of the invention contains Bi and Al as additional elements.

Bi is an element that is effective for reducing the particle size and enhancing the magnetic characteristics. The most part of Bi in the raw material mixture is incorporated in the hexagonal ferrite magnetic powder. As a result of various investigations, it has been found that for sufficiently achieving the aforementioned function of Bi, it is effective to control the amount of Bi added to the raw material mixture in such a manner that the magnetic powder has a Bi/Fe molar ratio of 2.5% or more, and more effectively 3.0% or more. However, in the case where the amount of Bi, which is a nonmagnetic component, contained in the magnetic powder is too large, there may be a problem of deterioration in magnetic characteristics derived therefrom depending on purposes in some cases. Accordingly, the Bi/Fe molar ratio is preferably 10.0% or less, and more preferably 6.0% or less.

Al is an additional element that is considerably effective for enhancing the durability of the magnetic layer of the magnetic recording medium. As a result of detailed investigations, it has been found that the effect of enhancing the durability may be exhibited with an Al/Fe molar ratio of the magnetic powder of 3.0% or more, more effectively 4.0% or more, and further effectively 4.5% or more. However, in the case where the amount of Al, which is a nonmagnetic component, contained in the magnetic powder is too large, there may be a problem of deterioration in magnetic characteristics. Accordingly, the Al/Fe molar ratio is 6.0% or less.

The enhancement of the durability of the magnetic recording medium with hexagonal ferrite magnetic powder containing Al is described in JP-A-2011-225417. In the case where hexagonal ferrite is obtained by a method of crystallizing an amorphous material of a raw material mixture, it is considered that Al contained in hexagonal ferrite powder is mainly present in the form of an Al oxide film formed on the surface layer of the particles. It is expected that the hard film thereof works for the enhancement of the durability.

A rare earth element may be added as another additional component. A rare earth element may contribute to reduction of the particle size of the hexagonal ferrite. At least one kind of a rare earth element is preferably contained in the raw material mixture in such an amount that provides an R/Fe molar ratio of from 0.1 to 1.0% in the analysis of the magnetic powder, wherein R represents the rare earth element. Sc and Y are encompassed in the rare earth element herein. Examples of the rare earth element that is preferably used include Nd, Sm, Y, Er and Ho, and among these, Nd, Sm and Y are more preferred.

Activation Volume Vact

The activation volume Vact calculated by measuring the magnetic characteristics of the powder is preferably from 1,400 to 1,800 $nm^3$. In the case where the magnetic powder is used in a magnetic recording medium, a higher packing density of the magnetic powder may be effective for enhancing the SNR (i.e., reducing the noise). In this connection, magnetic powder having a smaller Vact is preferably used, but it is necessary to reduce significantly the particle size of the magnetic powder for obtaining a considerably small Vact, which may result in difficulty in the production thereof. In the case of an M-type hexagonal ferrite having Ba as alkaline earth metal element sites, furthermore, a smaller particle size thereof may cause increase of the loss of Ba in the acid cleaning process. The loss of Ba may cause deterioration of the magnetic characteristics, and may be a factor that cancels the effect of enhancing the SNR due to the reduction of the particle size (i.e., the reduction of the Vact). On the other hand, a larger Vact may prevent the loss of Ba from occurring, but due to the large particle size, a larger Vact may reduce the effect of enhancing the SNR of the magnetic recording medium, thereby failing to deal with the severe SNR characteristics of these days. As a result of investigations on these factors, it has been found that in the case where the enhancement of SNR is important in hexagonal ferrite magnetic powder containing Ba as a major component, the activation volume Vact is preferably from 1,400 to 1,800 nm$^3$. The Vact may be controlled to a range of from 1,450 to 1,750 nm$^3$.

In the case where the hexagonal ferrite is synthesized by a method of crystallizing an amorphous material of a raw material mixture, the activation volume Vact of the resulting hexagonal ferrite powder may be controlled by the combination of the component composition of the amorphous material and the crystallization conditions, particularly the heating temperature.

Magnetic Characteristics

The magnetic powder of the invention preferably has a coercive force Hc of from 159 to 279 kA/m (which is approximately from 2,000 to 3,500 Oe) and a coercivity distribution SFD of from 0.3 to 1.0. The magnetic powder preferably has a saturation magnetization as of from 40.0 to 45.0 A·m$^2$/kg and a squareness ration SQR of from 0.48 to 0.56. The magnetic powder that has these characteristics is useful as a material for high density recording.

Specific Surface Area Sbet

For reducing noise of a magnetic recording medium, it is effective to use magnetic powder having a decreased particle size. For expressing the size factor of the particles by the specific surface area, the magnetic powder preferably has a specific surface area Sbet according to the BET single point method of from 75 to 100 m$^2$/g.

Production Method of Magnetic Powder

The hexagonal ferrite magnetic powder of the invention may be produced by a method of crystallizing an amorphous material of a raw material mixture. Specifically, the magnetic powder may be produced, for example, by the following process.

Raw Material Mixing Step

Various raw material substances containing elements that constitute the hexagonal ferrite magnetic powder and elements that are necessary for forming the amorphous material are mixed to form a raw material mixture. The hexagonal ferrite magnetic powder of the invention has a basic structure BaO.6Fe$_2$O$_3$, has Fe sites that may be partially substituted by at least one kind of a divalent or tetravalent transition metal, contains Bi and Al as additional elements, and may contain a rare earth element depending on necessity. Ba and B are preferably contained in a large amount as elements for providing the amorphous material. As sources of the metal elements among these elements, oxides and hydroxides of the metal elements may be used. As sources of Ba and B, BaCO$_3$ and H$_3$BO$_3$ are preferably used respectively.

Ba is a constitutional element of the hexagonal ferrite and is simultaneously an element that forms the amorphous material. The hexagonal ferrite magnetic powder of the invention contains Al and maintains a high Ba/Fe molar ratio, as described above. On mixing the raw materials, the raw material mixing ratio is determined in consideration of the balance among Ba and the elements necessary for providing the amorphous material to distribute Ba to the hexagonal ferrite in an amount that is sufficient for the crystallizing step, based on the fact that loss of Ba occurs due to acid cleaning and the like as the subsequent process steps.

The raw material substances may be mixed by agitation in a mixer to provide the raw material mixture. The raw material substances are preferably mixed under shearing force with a mixer having agitation blades, such as a Henschel mixer.

Granulating Step

The resulting raw material mixture is generally formed into spherical granules having a prescribed particle diameter in consideration of the handleability and the like in the subsequent process steps. For example, the raw material mixture is formed into a spherical shape with the addition of water and a binder component depending on necessity in a pan granulator to make particles having a diameter of approximately from 1 to 50 mm, which are then dried by heating to a temperature of approximately from 200 to 300° C., thereby providing a granulated product.

Amorphization Step

The raw material mixture after drying (i.e., the granulated product above) is melted at a high temperature to make a molten material at a temperature of from 1,350 to 1,450° C. The molten material is then quenched to make an amorphous material. Examples of the method of quenching include a twin roller method, a gas atomization method, a water atomization method and a centrifugal atomization method. According to the investigations made by the inventors, an amorphous material may be more preferably obtained by a gas atomization method in the case where hexagonal ferrite crystals having a sufficient Ba content and a reduced particle size with an activation volume Vact within the aforementioned range are produced from an amorphous material containing Al and Bi. The amorphous material thus obtained may be pulverized with a ball mill or the like and then regulated in particle size, depending on necessity.

Crystallization Step

The amorphous material is heated and retained at a temperature range of from 600 to 720° C., and preferably from 620 to 700° C., to deposit hexagonal ferrite crystals. The retention time may be generally from 60 to 240 minutes. The powder obtained by the heat treatment for crystallization contains hexagonal ferrite crystals and further contains substances that are formed through crystallization of the residual components contained in the amorphous material (mainly barium borate crystals).

Acid Cleaning Step

For extracting hexagonal ferrite particles from the powder obtained by the crystallizing step, the residual substances containing mainly barium borate are removed by dissolution with an acid. This procedure is referred to as acid cleaning herein. The acid cleaning liquid used is preferably an acetic acid aqueous solution having a concentration of from 2 to 12% by mass. The powder obtained by the crystallization step is immersed in an acid cleaning liquid and preferably retained at a temperature of from 50° C. to the boiling point of the acid cleaning liquid. The acid cleaning liquid is preferably stirred. The pH of the acid cleaning liquid is preferably 4.0 or less. After completing the dissolution of the residual substances, the hexagonal ferrite powder is extracted through solid-liquid separation.

As described above, Ba constituting the hexagonal ferrite is partially dissolved by the acid cleaning, i.e., Ba loss occurs. In the case where the Ba content is smaller than the stoichiometric Ba amount of the M-type hexagonal ferrite, it is considered that the Ba sites are partially vacant. It is considered that when the amount of the vacant sites exceeds a certain value, the magnetic characteristics may be drastically deteriorated. In particular, M-type hexagonal ferrite having a reduced particle size with a Vact of 1,800 nm$^3$ or less is liable to suffer Ba loss due to acid cleaning. The hexagonal ferrite magnetic powder of the invention has a Ba/Fe molar ratio of 8.0% or more from the standpoint that such a Ba content is ensured that stably maintains high SNR of the recording medium. According to the detailed experimentations by the inventors, it has been confirmed that hexagonal ferrite magnetic powder having a Ba/Fe molar ratio of 8.0% or more may be consequently obtained by controlling the composition of the raw material mixture and the crystallization conditions (the crystallization temperature) even though Ba loss occurs due to acid cleaning.

Water Rinsing Step

The hexagonal ferrite powder thus extracted through the solid-liquid separation has the acid cleaning liquid attached thereto, and therefore is then rinsed with water to remove the acid cleaning liquid. This procedure is referred to as water rinsing herein. As the initial stage of the water rinsing step, the acid cleaning liquid may be neutralized with an alkali aqueous solution, such as aqueous ammonia, a sodium hydroxide aqueous solution and a potassium hydroxide aqueous solution. The concentration of the alkali aqueous solution may be controlled, for example, to a range of from 0.01 to 1.5 mol/L for a sodium hydroxide aqueous solution. In the water rinsing step, the hexagonal ferrite powder is finally rinsed sufficiently with pure water. Specifically, the hexagonal ferrite powder is preferably rinsed carefully until the conductivity of the rinsing liquid after rinsing (filtrate) reaches 10 µS/cm or less.

The hexagonal ferrite powder after rinsing with water is generally dried in the air at 100° C. or more.

Magnetic Recording Medium

The hexagonal ferrite magnetic powder according to the invention may be applied to a magnetic layer of a magnetic recording medium. A magnetic recording medium, to which the hexagonal ferrite magnetic powder according to the invention may be preferably applied, is described below with reference to a magnetic tape as an example. The magnetic tape is constituted by a magnetic layer, a nonmagnetic layer and a nonmagnetic support in this order from the upper surface thereof, which is in contact with a magnetic head, and may also have a backcoat layer thereunder in some cases.

Magnetic Layer

The magnetic layer contains the hexagonal ferrite magnetic powder and a binder.

Examples of the binder include a polyurethane resin, a polyester resin, a polyamide resin, a vinyl chloride resin, an acrylic resin obtained by copolymerizing styrene, acrylonitrile, methyl methacrylate and the like, a cellulose resin, such as nitro cellulose, an epoxy resin, a phenoxy resin, and a polyvinyl alkylal resin, such as polyvinyl acetal and polyvinyl butyral, and one resin selected therefrom or a mixture of two or more resins selected therefrom may be used. Among these, a polyurethane resin, an acrylic resin, a cellulose resin and a vinyl chloride resin are particularly preferred. The resin may also be used as a binder of the nonmagnetic layer described later. For enhancing the dispersibility of the magnetic powder, the binder preferably has a functional group that is adsorbed to the surface of the powder (i.e., a polar group). Examples of the functional group include $-SO_3M$, $-SO_4M$, $-PO(OM)_2$, $-OPO(OM)_2$, $-COOM$, $=NSO_3M$, $=NRSO_3M$, $-NR^1R^2$, and $-N^+R^1R^2R^3X^-$, wherein M represents hydrogen or an alkali metal, such as Na and K, R represents an alkylene group, $R^1$, $R^2$ and $R^3$ each represent an alkyl group, a hydroxyalkyl group or hydrogen, and X represents a halogen, such as Cl and Br. The amount of the functional group in the binder is preferably from 10 to 200 µeq/g, and more preferably from 30 to 200 µeq/g, for providing favorable dispersibility.

The binder preferably has a molecular weight of from 10,000 to 200,000 in terms of mass average molecular weight. The molecular weight is preferably in the range since the coated layer may have sufficient strength and good durability and may exhibit enhanced dispersibility.

The amount of the binder may be controlled, for example, to a range of from 5 to 50% by mass, and preferably from 10 to 30% by mass, based on the magnetic powder. A polyisocyanate curing agent may also be used in combination with the aforementioned resins.

The magnetic layer may further contain an additive depending on necessity. Examples of the additive include, an abrasive, a lubricant, a dispersant and a dispersion assistant, an antifungal agent, an antistatic agent, an antioxidant, a solvent, and carbon black, which may be used in an appropriate amount depending on a desired property after appropriately selecting from commercially available products and products produced by known methods. Examples of the carbon black that may be used in the magnetic layer include furnace black for rubber, thermal black for rubber, carbon black for coloration and acetylene black. Examples of the lubricant include fatty acids and derivatives, such as esters, thereof that are widely used therefor. Examples of the fatty acid include capric acid, caprylic acid, lauric acid, myristic acid, palmitic acid, stearic acid, behenic acid, oleic acid, elaidic acid, linoleic acid, linolenic acid and isostearic acid. Examples of the ester include butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecylpalmitate, isohexadecyl stearate, oleyl oleate, dodecyl stearate, tridecyl stearate, oleyl erucate, neopentyl glycol didecanoate and ethylene glycol dioleate. The content of the fatty acid or a derivative thereof is, for example, from 0.1 to 20 parts by mass per 100 parts by mass of the ferromagnetic material. The content thereof in the nonmagnetic layer described later is, for example, from 0.01 to 10 parts by mass per 100 parts by mass of the nonmagnetic powder.

The thickness of the magnetic layer may be optimized in consideration of the saturation magnetization and the head gap width of the magnetic head used and the bandwidth of the signal to be recorded, and is generally from 0.01 to 0.15 µm, preferably from 0.02 to 0.12 µm, and more preferably from 0.03 to 0.10 µm. The magnetic layer may be constituted by at least one layer, and a multi-layer magnetic layer having two or more layers having different magnetic characteristics may also be used.

Nonmagnetic Layer

The magnetic recording medium may have a nonmagnetic layer containing nonmagnetic powder and a binder, between the magnetic layer and the nonmagnetic support. The nonmagnetic powder that may be used in the nonmagnetic layer may be an inorganic substance or an organic substance, and carbon black and the like may also be used. Examples of the inorganic substance include, a metal, a metal oxide, a metal carbonate, a metal sulfate, a metal nitride, a metal carbide and a metal sulfide. The nonmagnetic powder may be available as a commercial product and may also be produced by a known method. Specific examples thereof include titanium oxide, such as titanium dioxide, cerium oxide, tin oxide, tungsten oxide, ZnO, $ZrO_2$, $SiO_2$, $Cr_2O_3$, α-alumina having an alphanisation degree of from 90 to 100%, β-alumina, γ-alumina, α-iron oxide, geothite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide and titanium carbide, which may be used solely or as a combination of two or more kinds thereof. Representative examples of the nonmagnetic powder include α-iron oxide, titanium oxide and carbon black.

The shape of the nonmagnetic powder may be any of an acicular shape, a spherical shape, a polygonal shape and a planar shape. The crystallite size of the nonmagnetic powder is preferably from 4 to 500 nm, and more preferably from 4 to 100 nm. The crystallite size in the range of from 4 to 500 nm is preferred since the dispersion thereof may not be difficult, and a suitable surface roughness may be provided. The average particle diameter of the nonmagnetic powder is preferably from 5 to 500 nm, and depending on necessity, plural kinds of the nonmagnetic powder having different average particle diameters may be combined, and a single kind of the nonmagnetic powder that has a broadened particle diameter distribution may be used to achieve the similar effect. The average particle diameter of the nonmagnetic powder is particularly preferably from 10 to 200 nm. The average particle diameter thereof in a range of from 5 to 500 nm is preferred since favorable dispersion thereof may be obtained, and a suitable surface roughness may be provided.

The specific surface area of the nonmagnetic powder may be, for example, from 1 to 150 $m^2/g$, preferably from 20 to 120 $m^2/g$, and more preferably from 50 to 100 $m^2/g$. When the specific surface area thereof is in a range of from 1 to 150 $m^2/g$, a suitable surface roughness may be provided, and the nonmagnetic powder may be dispersed with a suitable amount of the binder. The dibutyl phthalate (DBP) oil absorption capacity of the nonmagnetic powder may be, for example, from 5 to 100 mL/100 g, preferably from 10 to 80 mL/100 g, and more preferably from 20 to 60 mL/100 g. The specific gravity thereof may be, for example, from 1 to 12, and preferably from 3 to 6. When the tap density thereof is in a range of from 0.05 to 2 g/mL, the amount of flying particles may be reduced to facilitate the handling thereof, and there is a tendency that the powder is not adhered to the equipments. The nonmagnetic powder preferably has a powder pH of from 2 to 11, and particularly preferably from 6 to 9. When the powder pH thereof is in a range of from 2 to 11, the increase in friction coefficient under a high temperature and high humidity condition or due to isolation of the fatty acid may be prevented from occurring. The water content of the nonmagnetic powder may be, for example, from 0.1 to 5% by mass, preferably from 0.2 to 3% by mass, and more preferably from 0.3 to 1.5% by mass. When the water content thereof is in a range of from 0.1 to 5% by mass, good dispersibility may be obtained, and the viscosity of the coating material after dispersion may be stabilized. The ignition loss of the nonmagnetic powder is preferably 20% by mass or less.

In the case where the nonmagnetic powder is inorganic powder, the Mohs hardness thereof is preferably from 4 to 10. When the Mohs hardness thereof is in a range of from 4 to 10, the durability thereof may be ensured. The stearic acid absorption amount of the nonmagnetic powder is preferably from 1 to 20 $\mu mol/m^2$, and more preferably from 2 to 15 $\mu mol/m^2$. The wetting heat with water at 25° C. of the nonmagnetic powder is preferably in a range of from 200 to 600 $erg/cm^2$ (from 200 to 600 $mJ/m^2$). A solvent having a wetting heat within the range may be used. An appropriate amount of water molecules on the surface of the nonmagnetic particle at 100 to 400° C. is from 1 to 10/10 nm. The pH of the isoelectric point in water of the nonmagnetic powder is preferably from 3 to 9. The nonmagnetic powder preferably has $Al_2O_3$, $SiO_2$, $TiO_2$, $ZrO_2$, $SnO_2$, $Sb_2O_3$ and ZnO present on the surface thereof through a surface treatment thereof. Particularly preferred examples among these from the standpoint of the dispersibility include $Al_2O_3$, $SiO_2$, $TiO_2$ and $ZrO_2$, and more preferred examples thereof include $Al_2O_3$, $SiO_2$ and $ZrO_2$. These compounds may be used solely or as a combination thereof. A surface-treated layer obtained by coprecipitation may be provided, and a method of treating with alumina and then treating the surface thereof with silica, and a method of the inverted operation may be employed depending on purposes. The surface-treated layer is generally preferably a homogeneous dense layer and may be a porous layer depending on purposes.

The binder, the lubricant, the dispersant, the additive, the solvent, the dispersing method and the like applied to the nonmagnetic layer may be those applied to the magnetic layer. In particular, with respect to the amount and the kind of the binder, and the addition amount and the kind of the additive and the dispersant, known techniques for a magnetic layer may be applied. The nonmagnetic layer may contain carbon black and organic powder.

The nonmagnetic layer may contain, in addition to the nonmagnetic powder, carbon black for reducing the surface electric resistance and the light transmittance, and controlling the hardness. Examples of the carbon black that may be used in the nonmagnetic layer include furnace black for rubber, thermal black for rubber, carbon black for coloration and acetylene black.

The specific surface area of the carbon black used in the nonmagnetic layer may be, for example, from 100 to 500 $m^2/g$, and preferably from 150 to 400 $m^2/g$, and the DBP absorption amount thereof may be, for example, from 20 to 400 mL/100 g, and preferably from 30 to 200 mL/100 g. The particle diameter of the carbon black may be, for example, from 5 to 80 nm, preferably from 10 to 50 nm, and more preferably from 10 to 40 nm. The carbon black preferably has a powder pH of from 2 to 10, a water content of from 0.1 to 10%, and a tap density of from 0.1 to 1 g/mL. The carbon black used may be surface-treated with a dispersant and the like, may be grafted with a resin, and may have a surface that is partially graphitized. The carbon black may be dispersed with a binder before adding to the coating material. The carbon black is preferably used in an amount of not exceeding 50% by mass with respect to the nonmagnetic powder and not exceeding 40% with respect to the total mass of the nonmagnetic layer. The carbon black may be used solely or as a combination of two or more kinds thereof. For the carbon black that may be used in the nonmagnetic layer, reference may be made, for example, to "Carbon Black Binran" (Carbon Black Handbook), edited by Carbon Black Association. The carbon black used may be a commercially available product.

The nonmagnetic layer may contain organic powder depending on purposes. Examples of the organic powder include acrylic styrene resin powder, benzoguanamine resin powder, melamine resin powder and a phthalocyanine pigment, and also include polyolefin resin powder, polyester resin powder, polyamide resin powder, polyimide resin powder and polyethylene fluoride resin powder. To the production method thereof, the techniques described in JP-A-62-18564 and JP-A-60-255827 may be applied.

The thickness of the nonmagnetic layer may be, for example, from 0.1 to 3.0 µm, preferably from 0.1 to 2.0 µm, and more preferably from 0.1 to 1.5 µm. The nonmagnetic layer may exhibit the effect thereof when the layer is substantially nonmagnetic. Specifically, while the nonmagnetic layer generally preferably has no residual magnetic flux density and no coercive force, the allowable residual magnetic flux density of the nonmagnetic layer may be 10 mT or less, and the allowable coercive force thereof may be 7.96 kA/m (100 Oe) or less. The layer having a residual magnetic flux density and a coercive force that are suppressed to the ranges is encompassed in the nonmagnetic layer herein even though the layer contains a small amount of a magnetic material as an impurity or intentionally.

Nonmagnetic Support

Examples of the nonmagnetic support include known biaxially stretched products, such as polyethylene terephthalate, polyethylene naphthalate, polyamide, polyamideimide and aromatic polyamide. Among these, polyethylene terephthalate, polyethylene naphthalate and polyamide are preferred. The support may be subjected in advance to a corona discharge treatment, a plasma treatment, an easy adhesion treatment, a heat treatment, or the like. The nonmagnetic support preferably has a surface roughness of from 3 to 10 nm in terms of arithmetic average roughness Ra at a cutoff value of 0.25 mm. The thickness of the nonmagnetic support may be generally from 3 to 10 µm.

Backcoat Layer

A backcoat layer may be provided on the surface of the nonmagnetic support on the opposite to the surface having the magnetic layer provided. The backcoat layer preferably contains carbon black and inorganic powder. To the binder and the various additives for forming the backcoat layer, the formulations of the magnetic layer and the nonmagnetic layer may be applied. The thickness of the backcoat layer is preferably 1.0 µm or less, and more preferably from 0.2 to 0.8 µm.

Production Method of Magnetic Recording Medium

The production method of the magnetic recording medium containing the hexagonal ferrite magnetic powder according to the invention used in the magnetic layer thereof is not particularly limited, and is described with reference to a coating type magnetic recording medium as an example.

A step of producing a coating material for forming the magnetic layer, the nonmagnetic layer or the backcoat layer generally contains at least a kneading step and a dispersing step, and also contains a mixing step provided depending on necessity before or after the steps. The steps may each be separated to two or more stages. All the raw materials including the ferromagnetic powder (i.e., the hexagonal ferrite magnetic powder according to the invention), the nonmagnetic powder, the binder, the carbon black, the abrasive, the antistatic agent, the lubricant and the solvent may be added at the initial stage or the middle stage of any of the steps. The raw materials may each be divided into two or more portions, which may be added in two or more different steps. For example, polyurethane may be divided into portions and added in the kneading step, the dispersing step and the mixing step for controlling the viscosity after dispersion. The kneading step is preferably performed with equipment having a strong kneading force, such as an open kneader, a continuous kneader, a pressure kneader and an extruder. For the details of the kneading process, reference may be made to JP-A-1-106338 and JP-A-1-79274. Glass beads may be used for dispersing the coating material for the magnetic layer, the coating material for the nonmagnetic layer and the coating material for the backcoat layer. A dispersion media having a high specific gravity, such as zirconia beads, titania beads and steel beads may be preferably used instead of glass beads. The diameter and the filling ratio of the dispersion medium used may be optimized. The dispersing equipment used may be a known equipment.

In the production method of the magnetic recording medium, for example, the coating material for the nonmagnetic layer is coated to a prescribed thickness on the surface of the running nonmagnetic support to form the nonmagnetic layer, and then the coating material for the magnetic layer is coated to a prescribed thickness thereon to form the magnetic layer. Plural kinds of the coating material for the magnetic layer may be coated sequentially or simultaneously to form a multilayer structure, and the coating material for the nonmagnetic layer and the coating material for the magnetic layer may be coated sequentially or simultaneously to form a multilayer structure. Examples of the coating equipment for coating the coating material for the magnetic layer and the coating material for the nonmagnetic layer include kinds of equipment for air doctor coater, blade coater, a rod coater, extrusion coater, air knife coater, squeeze coater, impregnation coater, reverse roll coater, transfer roll coater, gravure coater, kiss coater, cast coater, spray coater and spin coater. For the details thereof, reference may be made, for example, to "Saishin Coating Gijutsu" (Newest Coating Techniques), published by Sogo Gijutsu Center, Co., Ltd. (May 31, 1983).

In the case of a magnetic tape, the coated layer of the coating material for the magnetic layer may be subjected to a magnetic field orientation treatment by applying a cobalt magnet or a solenoid to the ferromagnetic powder contained in the coated layer of the coating material for the magnetic layer. In the case of a magnetic disk, a known random magnetic field orientation equipment, such as cobalt magnets disposed obliquely and alternately and application of an alternating magnetic field with a solenoid, is preferably used although a sufficiently isotropic orientation may be obtained with no orientation using no orientation equipment in some cases. Magnetic characteristics that are isotropic in the circumferential direction may be imparted to make vertical orientation by using a known method, such as a magnetically opposed magnet. In the case where high density recording is to be performed, in particular, vertical orientation is preferred. A circumferential orientation may be made by spin coating.

The drying position of the coated film is preferably controlled by controlling the temperature and the flow rate of the drying air and the coating speed. The coating speed is preferably from 20 to 1,000 m/min, and the temperature of the drying air is preferably 60° C. or more. The coated layer may be preliminarily dried appropriately before entering the zone where the magnetic is applied thereto.

The coated raw material thus obtained is once wound onto a winding roll, and thereafter wound off from the winding roll for subjecting to a calender treatment. In the calender treatment, for example, a super calender roll or the like may be used. By the calender treatment, the surface smoothness is improved, and voids formed due to the removal of the solvent in the drying step are removed to enhance the packing density of the ferromagnetic powder in the magnetic layer, thereby providing a magnetic recording medium having high electromagnetic conversion characteristics. The step of the calender treatment is preferably performed while changing the calender conditions depending on the smoothness of the surface of the coated raw material. The calender roll used may be a heat resistant resin roll formed of such a resin as epoxy, polyimide, polyamide, polyamideimide or the like, or may be a metallic roll.

The calender treatment conditions may be a calender roll temperature, for example, of from 60 to 110° C., preferably from 70 to 110° C., and particularly preferably from 80 to 110° C., and a pressure, for example, of from 100 to 500 kg/cm (from 98 to 490 kN/m), preferably from 200 to 450 kg/cm (from 196 to 441 kN/m), and particularly preferably from 300 to 400 kg/cm (from 294 to 392 kN/m). The surface of the nonmagnetic layer may also be subjected to a calender treatment, for example, under the aforementioned conditions.

The resulting magnetic recording medium may be used after slitting into a desired size with a cutting machine or the like. The cutting machine used is not particularly limited and preferably has plural sets of rotating upper and lower blades (male and female blades), and the slitting speed, the overlapping length of the blades, the circumferential velocity ratio of the upper blade (male blade) and the lower blade (female blade) (circumferential velocity of upper blade/ circumferential velocity of lower blade), the continuous use time of the slitting blades, and the like may be appropriately determined.

The magnetic recording medium described above contains the hexagonal ferrite magnetic powder according to the invention, and thereby achieving excellent electromagnetic conversion characteristics in high density recording range while maintaining the high durability of the magnetic layer.

EXAMPLE

Hexagonal ferrite magnetic powder was produced according to various formulations, and the resulting magnetic powder was subjected to analysis of the components, measurement of the magnetic characteristics, measurement of the specific surface area, and calculation of the activation volume Vact. Magnetic tapes were produced by using the magnetic powder and were evaluated for the electromagnetic conversion characteristics (including the reproduction output and the SNR) and the durability of the coated film. The methods for measurements and evaluations and the results thereof are shown below.

Production of Hexagonal Ferrite Magnetic Powder

As raw materials, boric acid $H_3BO_3$ (industrial use), aluminum hydroxide $Al(OH)_3$ (extra pure reagent), barium carbonate $BaCo_3$ (industrial use), iron oxide $Fe_2O_3$ (industrial use), cobalt oxide CoO (reagent with purity of 90% or more), titanium oxide $TiO_2$ (extra pure reagent), bismuth oxide $Bi_2O_3$ (industrial use) and neodymium oxide $Nd_2O_3$ (industrial use) were weighed and mixed with FM Mixer, available from Mitsui Miike Machinery Co., Ltd., to provide a raw material mixture. The weighed amounts in each example are shown in Table 1. The raw material mixture was granuled to a spherical shape with water sprayed thereon in a pelletizer, and then dried at 270° C. for 14 hours to provide granules having a particle diameter of from 1 to 50 mm.

The granules were melted by using a platinum crucible in a melting furnace. The raw material mixture was heated to 1,400° C. and maintained at that temperature for 60 minutes under stirring for converting the raw material substances to the completely molten state, and the molten material was then quenched by ejecting from a nozzle according to the gas atomizing method to provide an amorphous material. The amorphous material thus obtained was crystallized by heating and retaining at a prescribed temperature to form hexagonal ferrite. The heating and retaining temperature is shown as the crystallization temperature in Table 1. The retention time at that temperature was 60 minutes.

The powder thus obtained by heating and retaining above contains a residual substance containing mainly barium borate, in addition to the hexagonal ferrite. The powder was immersed in an acetic acid aqueous solution having a concentration of from 6 to 10% by mass heated to a temperature of from 60 to 85° C. and retained therein under stirring for from 1 to 2 hours, thereby dissolving the residual substance in the solution. Thereafter, solid-liquid separation was performed by filtration, and the solid content was collected. In this acid cleaning process, it is considered that Ba that occupies the Ba sites of the hexagonal ferrite may be partially eluted as described above. The acid cleaning conditions are shown in Table 1.

The solid content thus collected after the acid cleaning was rinsed with pure water to remove the components including acetic acid attached to the surface of the particles. The solid content was rinsed until the conductivity of the rinsing liquid after rinsing (filtrate) reached 10 μS/cm or less. The solid content after rinsing with water was dried in the air at 110° C. to provide a specimen of the hexagonal ferrite magnetic powder.

Component Analysis of Magnetic Powder

The component analysis of the hexagonal ferrite magnetic powder specimen was performed by using a high frequency inductively coupled plasma atomic emission spectrometer, ICP (720-ES), available from Agilent Technologies, Inc. The molar ratios of the elements with respect to Fe were calculated from the resulting quantitative values. The X/Fe molar ratio (%) (wherein X is, for example, Ba, Bi or Al) is calculated according to the following expression.

$$X/Fe \text{ molar ratio } (\%) = ((X \text{ content } (\% \text{ by mol}))/ (Fe \text{ content } (\% \text{ by mol}))) \times 100$$

Measurement of Powder Magnetic Characteristics

The hexagonal ferrite magnetic powder specimen was filled in a resin container having a diameter of 6 mm and measured for the coercive force Hc, the saturation magnetization as, the squareness ratio SQR and the coercivity distribution SFD (the SFD value of the bulk powder) under application of an external magnetic field of 795.8 kA/m (10 kOe) by using a VSM equipment, VSM-P7-15, available from Toei Industry Co., Ltd.

Measurement of Specific Surface Area

The hexagonal ferrite magnetic powder specimen was measured for the specific surface area Sbet according to the BET single point method by using 4 Sorb US, available from Yuasa Ionics Co., Ltd.

Calculation of Activation Volume Vact

The hexagonal ferrite magnetic powder was magnetized to saturation by using a pulse magnetic field generator, available from Toei Industry Co., Ltd., and a specimen vibration magnetic flux meter, available from Toei Industry Co., Ltd., and then applied with a magnetic field in the opposite direction to the saturation magnetization direction (referred to as a reversed magnetic field) for 0.76 ms, and the residual magnetization after removing the magnetic field was measured. The value of the reversed magnetic field Hr (0.76 ms) where the residual magnetization became 0 $Am^2$/kg was obtained by varying the value of the reversed magnetic field. The value Hr is referred to as a residual coercive force. The value of the reversed magnetic field applied may be appropriately changed depending on the Hr value of the magnetic material. Subsequently, the same operation was performed by changing the application time of the magnetic field to 8.4 ms, and the residual coercive force Hr (8.4 ms) where the residual magnetization became 0 $Am^2$/kg was obtained. Furthermore, the same operation was performed by changing the application time of the magnetic field to 17 s, and the residual coercive force Hr (17 s) where the residual magnetization became 0 $Am^2$/kg was obtained. The values of H0 and KuV/kT were calculated from Hr (0.76 ms), Hr (8.4 ms) and Hr (17 s) according to the following expression (1), and the activation volume Vact was obtained by substituting the resulting values into the following expression (2).

$$Hr(t) = H0(1 - ((kT/KuV)\ln(f0t/\ln 2))^{0.77}) \quad (1)$$

wherein Hr(t) represents the residual coercive force at application time t, H0 represents the residual coercive force at the $10^{-9}$ second order, f0 represents the spin precession frequency, and t represents the retention time of the reversed magnetic field.

$$Vact(nm^3) = 1.505 \times 10^5 \times KuV/kT/H0 \quad (2)$$

Production of Magnetic Recording Medium (Magnetic Tape)

In the following description relating to the production of a magnetic tape, all the parts and percentages are parts by mass and percentages by mass unless otherwise indicated.

Formulation of Coating Material for Magnetic Layer

| | |
|---|---|
| hexagonal barium ferrite magnetic powder | 100 parts |
| $SO_3Na$ group-containing polyurethane resin | 14 parts |
| (average molecular weight: 70,000, $SO_3Na$ group content: 0.2 meq/g) | |
| alumina powder | 6 parts |
| (average particle diameter: 120 nm) | |
| colloidal silica | 2 parts |
| (average particle diameter: 100 nm) | |
| methyl ethyl ketone | 1.4 parts |
| stearic acid | 2 parts |
| butyl stearate | 6 parts |
| polyisocyanate | 2.5 parts |
| (Coronate, available from Nippon Polyurethane Industry Co., Ltd.) | |
| cyclohexanone | 350 parts |
| methyl ethyl ketone | 350 parts |

Formulation of Coating Material for Nonmagnetic Layer

| | |
|---|---|
| nonmagnetic powder | 100 parts |
| (α-iron oxide, average major axis length: 10 nm, average acicular ratio: 1.9, BET specific surface area: 75 $m^2$/g) | |
| carbon black | 25 parts |
| (average particle diameter: 20 nm) | |
| $SO_3Na$ group-containing polyurethane resin | 18 parts |
| (average molecular weight: 70,000, $SO_3Na$ group content: 0.2 meq/g) | |
| stearic acid | 1 part |
| cyclohexanone | 300 parts |
| methyl ethyl ketone | 300 parts |

Formulation of Coating Material for Backcoat Layer

| | |
|---|---|
| nonmagnetic inorganic powder | 80 parts |
| (α-iron oxide, average major axis length: 0.15 μm, average acicular ratio: 7, BET specific surface area: 52 $m^2$/g) | |
| carbon black | 20 parts |
| (average particle diameter: 20 nm) | |
| vinyl chloride copolymer | 13 parts |
| sulfonic acid salt group-containing polyurethane resin | 6 parts |
| phenylphosphonic acid | 3 parts |
| cyclohexanone | 155 parts |
| methyl ethyl ketone | 155 parts |
| stearic acid | 3 parts |
| butyl stearate | 3 parts |
| polyisocyanate | 5 parts |
| cyclohexanone | 200 parts |

Production of Magnetic Tape

The coating material for a magnetic layer was prepared in such a manner that the substances according to the formulation of the coating material for a magnetic layer were dispersed with zirconia beads having a diameter of 0.5 mm (bead dispersion) for 24 hours in a batch vertical sand mill, and then filtered through a filter having an average pore diameter of 0.5 μm.

The coating material for a nonmagnetic layer was prepared in such a manner that the substances according to the formulation of the coating material for a nonmagnetic layer were dispersed with zirconia beads having a diameter of 0.1 mm (bead dispersion) for 24 hours in a batch vertical sand mill, and then filtered through a filter having an average pore diameter of 0.5 μm.

The coating material for a backcoat layer was prepared in such a manner that the substances according to the formulation of the coating material for a backcoat layer except for the lubricants (stearic acid and butyl stearate), the polyisocyanate and 200 parts of cyclohexanone were kneaded and diluted in an open kneader and then dispersed with zirconia beads having a diameter of 1 mm in a horizontal bead mill dispersing equipment at a bead filling ratio of 80% and a circumferential velocity of the rotor point of 10 m/sec by 12 passes, where the one pass retention time was 2 minutes, and then after adding the residual substances thereto, the mixture was agitated with a dissolver to provide a dispersion liquid, which was then filtered through a filter having an average pore diameter of 1 μm.

On a surface of a polyethylene naphthalate support having a thickness of 5 μm (Young's modulus in transverse direction: 8 GPa, Young's modulus in longitudinal direction: 6 GPa), the coating material for a nonmagnetic layer prepared above was coated and dried to a thickness of 100 nm after drying, and then the coating material for a magnetic layer prepared above was coated thereon to a thickness of 70 nm after drying. While the coating material for a magnetic layer was not dried, a vertical orientation treatment was performed by applying a magnetic field having an intensity of 0.3 T in the direction perpendicular to the coated surface, followed by drying the coated film. Thereafter, the coating material for a backcoat layer prepared above was coated and dried on the opposite surface of the support to a thickness of 0.4 μm after drying. The resulting original tape was subjected to a surface smoothing treatment with a calender formed only of a metallic roll at a speed of 100 m/min, a linear pressure of 300 kg/cm and a temperature of 100° C., and then subjected to a heat treatment in a dry environment at 70° C. for 36 hours. The original tape after subjecting to the heat treatment was slit into a ½ inch width to provide a magnetic tape.

Measurement of Electromagnetic Conversion Characteristics

Under an environment of 23° C.±1° C., the magnetic tape produced above was recorded with a signal at a linear recording density of 200 kfci with a recording head (MIG, gap: 0.15 μm, 1.8 T) and a reproduction GMR head (reproduction track width: 1 μm) mounted on a loop tester, and then the reproduction output and the SNR were measured. Hexagonal ferrite magnetic powder that achieves noise characteristics providing SNR of 1.0 dB or more may be evaluated to have a capability that is capable of dealing with the strong future needs associated with high density recording.

Evaluation of Coated Film Durability

Under an environment of 23° C. and 50% RH (Relative Humidity), the magnetic layer of the magnetic tape was in contact with a cylindrical member formed of SUS 420J at a wrap angle of 30°, to which a tension of 150 g was applied, and the magnetic tape was made to run for 10,000 passes and 30,000 passes. After completing the running, the surface of the tape was observed with a digital microscope, available from Keyence Corporation, and the number of scratches in the longitudinal direction having a length of 3 mm or more present on one line in parallel to the transverse direction of the tape (i.e., the number of the scratches intersecting the line) was measured over the whole width (½ inch) at the arbitrarily selected position in the longitudinal direction of the tape. The measurement was performed at different 10 positions in the longitudinal direction of the tape (i.e., the number of tests n=10), and the average value of the number of scratches for the 10 positions was designated as the scratch index expressing the score for the tape. The durability of the coated film was evaluated according to the following standard.

5: scratch index of less than 1.0
4: scratch index of 1.0 or more and less than 4.0
3: scratch index of 4.0 or more and less than 9.0
2: scratch index of 9.0 or more and less than 16.0
1: scratch index of 16.0 or more When the grade 4 or higher for the damage of the tape is obtained after 30,000 passes, it may be determined that the tape has a practically sufficient coated film durability. Accordingly, a tape having the grade 4 or higher was determined to pass the test.

The results are shown in Table 1.

TABLE 1

| | | Example 1 | Example 2 | Example 3 | Example 4 | Example 5 | Example 6 | Example 7 | Comparative Example 1 | Comparative Example 2 |
|---|---|---|---|---|---|---|---|---|---|---|
| Raw material formulation (g) | $H_3BO_3$ | 661.5 | 638.6 | 638.5 | 638.8 | 638.7 | 638.6 | 638.4 | 701.2 | 693.4 |
| | $Al(OH)_3$ | 52.1 | 51.9 | 51.9 | 51.9 | 51.9 | 51.9 | 51.9 | 0.0 | 51.4 |
| | $BaCO_3$ | 1285.1 | 1312.3 | 1312.1 | 1312.5 | 1312.3 | 1312.3 | 1311.8 | 1283.5 | 1268.3 |
| | $Fe_2O_3$ | 765.9 | 762.8 | 770.1 | 741.6 | 748.5 | 762.8 | 777.6 | 766.9 | 754.9 |
| | $CoO$ | 14.4 | 14.3 | 7.2 | 24.4 | 17.6 | 14.3 | 0.0 | 14.4 | 14.2 |
| | $TiO_2$ | 15.3 | 15.3 | 15.4 | 26.0 | 26.2 | 15.3 | 15.6 | 15.3 | 15.1 |
| | $Bi_2O_3$ | 89.4 | 89.0 | 89.0 | 89.0 | 89.0 | 89.0 | 89.0 | 89.5 | 88.1 |
| | $Nd_2O_3$ | 116.2 | 115.7 | 115.7 | 115.7 | 115.7 | 115.7 | 115.7 | 129.3 | 114.6 |
| Crystallization temperature (° C.) | | 630 | 643 | 658 | 657 | 682 | 638 | 668 | 615 | 612 |
| Acid cleaning condition | Temperature (° C.) | 85 | 85 | 85 | 85 | 85 | 85 | 85 | 60 | 85 |
| | Treating time (h) | 2 | 2 | 2 | 2 | 2 | 2 | 2 | 1 | 2 |
| | Acetic acid concentration (% by mass) | 6.0 | 6.0 | 6.0 | 6.0 | 6.0 | 6.0 | 6.0 | 10.0 | 6.0 |
| Magnetic powder molar ratio (%) | Ba/Fe | 8.0 | 8.2 | 8.7 | 9.2 | 9.2 | 8.1 | 8.9 | 8.7 | 7.7 |
| | Al/Fe | 4.9 | 4.9 | 5.1 | 5.3 | 5.2 | 5.1 | 5.1 | 0.0 | 3.5 |
| | Co/Fe | 1.8 | 1.9 | 1.0 | 3.2 | 2.0 | 1.9 | 0.0 | 1.8 | 1.8 |
| | Ti/Fe | 2.0 | 2.0 | 2.0 | 3.5 | 3.4 | 2.0 | 2.0 | 2.0 | 2.0 |
| | Bi/Fe | 3.8 | 3.9 | 4.0 | 3.9 | 3.8 | 4.0 | 3.7 | 3.5 | 3.9 |
| | Nd/Fe | 0.5 | 0.6 | 0.5 | 0.5 | 0.4 | 0.6 | 0.5 | 0.6 | 0.8 |
| Magnetic powder characteristics | Hc (kA/m) | 182 | 199 | 231 | 164 | 197 | 174 | 235 | 199 | 187 |
| | σs ($Am^2/kg$) | 41.0 | 41.2 | 41.0 | 42.2 | 42.1 | 41.3 | 39.7 | 44.7 | 42.0 |
| | SQR | 0.51 | 0.52 | 0.54 | 0.49 | 0.51 | 0.51 | 0.54 | 0.52 | 0.52 |
| | SFD | 0.72 | 0.68 | 0.52 | 0.89 | 0.71 | 0.75 | 0.62 | 0.58 | 0.70 |
| | Sbet ($m^2/g$) | 97 | 91 | 88 | 86 | 77 | 98 | 86 | 94 | 91 |
| | Vact ($nm^3$) | 1560 | 1570 | 1570 | 1590 | 1750 | 1480 | 1480 | 1660 | 1630 |
| Magnetic medium characteristics | Electromagnetic conversion | Output (dB) | 1.2 | 1.5 | 1.9 | 1.2 | 1.4 | 1.0 | 1.3 | 2.0 | 0.9 |
| | | SNR (dB) | 1.3 | 1.5 | 1.8 | 1.4 | 1.4 | 1.5 | 1.3 | 1.2 | 0.4 |
| | Coated layer durability | 10k passes | 5 | 5 | 5 | 5 | 5 | 5 | 5 | 3 | 5 |
| | | 30k passes | 5 | 5 | 5 | 5 | 5 | 5 | 5 | 1 | 4 |

It is understood from Table 1 that in hexagonal ferrite magnetic powder containing prescribed amounts of Bi and Al, hexagonal ferrite magnetic powder that has a Ba/Fe molar ratio of 8.0% or more according to the invention may stably exhibit high SNR, and provide high capability for the coated film durability of the magnetic layer in a magnetic recording medium. On the other hand, Comparative Example 1 uses hexagonal ferrite magnetic powder having the formulation that does not contain Al, and is deteriorated in the coated film durability. Comparative Example 2 uses hexagonal ferrite magnetic powder having a Ba/Fe molar ratio that is reduced to 7.7, and suffers significant reduction of the SNR.

What is claimed is:

1. Hexagonal ferrite magnetic powder for a magnetic recording medium, having a Ba/Fe molar ratio of 8.0% or more, a Bi/Fe molar ratio of 2.5% or more and an Al/Fe molar ratio of from 3.0 to 6.0%.

2. The hexagonal ferrite magnetic powder according to claim 1, wherein the hexagonal ferrite magnetic powder has an activation volume Vact of from 1,400 to 1,800 nm$^3$.

3. The hexagonal ferrite magnetic powder according to claim 1, wherein the hexagonal ferrite magnetic powder has a coercive force Hc of from 159 to 279 kA/m and a coercivity distribution SFD of from 0.3 to 1.0.

4. The hexagonal ferrite magnetic powder according to claim 1, wherein the hexagonal ferrite magnetic powder contains, as an element that substitutes an Fe site of the hexagonal ferrite, at least one kind selected from divalent transition metals and tetravalent transition metals.

* * * * *